(12) United States Patent
Thompson et al.

(10) Patent No.: US 10,723,359 B2
(45) Date of Patent: Jul. 28, 2020

(54) METHODS, SYSTEMS, AND MEDIA FOR CONTROLLING ACCESS TO VEHICLE FEATURES

(71) Applicant: Rivian IP Holdings, LLC, Plymouth, MI (US)

(72) Inventors: Michael Thompson, San Francisco, CA (US); Umit Batur, San Jose, CA (US); Paul Theodosis, Dublin, CA (US); Oliver Jeromin, Ypsilanti, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 204 days.

(21) Appl. No.: 15/952,002

(22) Filed: Apr. 12, 2018

(65) Prior Publication Data

US 2019/0315369 A1  Oct. 17, 2019

(51) Int. Cl.
*B60W 40/08* (2012.01)
*B60W 30/14* (2006.01)
*B60W 30/12* (2020.01)

(52) U.S. Cl.
CPC ............ *B60W 40/08* (2013.01); *B60W 30/12* (2013.01); *B60W 30/146* (2013.01); *B60W 2040/0809* (2013.01); *B60W 2540/043* (2020.02); *B60W 2710/20* (2013.01)

(58) Field of Classification Search
CPC .......... B60W 40/08; B60W 2540/043; B60W 30/12; B60W 2710/20; B60W 30/146; B60W 2040/0809
See application file for complete search history.

(56) References Cited

U.S. PATENT DOCUMENTS

| | | |
|---|---|---|
| 2010/0087987 A1 | 4/2010 | Huang et al. |
| 2015/0077235 A1 | 3/2015 | Pisz et al. |
| 2018/0059663 A1* | 3/2018 | Yako ..................... B60W 50/12 |
| 2019/0204827 A1* | 7/2019 | Bhalla .................. G05D 1/0061 |

OTHER PUBLICATIONS

International Search Report and Written Opinion dated Jul. 3, 2019 in International Patent Application No. PCT/US2019/027307.

* cited by examiner

*Primary Examiner* — Fadey S. Jabr
*Assistant Examiner* — Chase L Cooley
(74) *Attorney, Agent, or Firm* — Clements Bernard Walker

(57) ABSTRACT

Methods, systems, and media for controlling access to vehicle features are provided. In some embodiments, the method comprises: determining identifying information of a driver of a vehicle; receiving an indication that the driver wants to activate a feature of the vehicle; determining whether the driver is qualified to activate the feature based on the identifying information; in response to determining that the driver is not qualified to activate the feature, inhibiting activation of the feature and causing a user interface to be presented that indicates that the feature cannot be used; and in response to determining that the driver is qualified to activate the feature, activating the feature.

18 Claims, 6 Drawing Sheets

METHODS, SYSTEMS, AND MEDIA FOR CONTROLLING ACCESS TO VEHICLE FEATURES

TECHNICAL FIELD

The disclosed subject matter relates to methods, systems, and media for controlling access to vehicle features.

BACKGROUND

Vehicles with autonomous or semi-autonomous features are becoming more prevalent. For example, many vehicles are capable of automatically braking in response to detecting a pedestrian or other object, steering a vehicle to stay within lane lines, adjusting a speed of a vehicle while in cruise control to not get too close to a vehicle in front, etc. Many of these autonomous or semi-autonomous features can be dangerous if used incorrectly. For example, a feature that allows a vehicle to be autonomously driven on a highway may be dangerous if used on a non-highway road. However, it can be difficult to determine if a driver of a vehicle is qualified to activate a particular autonomous or semi-autonomous feature.

Accordingly, it is desirable to provide new methods, systems, and media for controlling access to vehicle features.

SUMMARY

Methods, systems, and media for controlling access to vehicle features are provided.

In accordance with some embodiments of the disclosed subject matter, a method for controlling access to vehicle features is provided, the method comprising: determining identifying information of a driver of a vehicle; receiving an indication that the driver wants to activate a feature of the vehicle; determining, using a hardware processor, whether the driver is qualified to activate the feature based on the identifying information; in response to determining that the driver is not qualified to activate the feature, inhibiting activation of the feature and causing a user interface to be presented that indicates that the feature cannot be used; and in response to determining that the driver is qualified to activate the feature, activating the feature.

In accordance with some embodiments of the disclosed subject matter, a system for controlling access to vehicle features is provided, the system comprising: a hardware processor that is programmed to: determine identifying information of a driver of a vehicle; receive an indication that the driver wants to activate a feature of the vehicle; determine whether the driver is qualified to activate the feature based on the identifying information; in response to determining that the driver is not qualified to activate the feature, inhibit activation of the feature and cause a user interface to be presented that indicates that the feature cannot be used; and in response to determining that the driver is qualified to activate the feature, activate the feature.

In accordance with some embodiments of the disclosed subject matter, a non-transitory computer-readable medium containing computer executable instructions that, when executed by a processor, cause the processor to perform a method for controlling access to vehicle features is provided, the method comprising: determining identifying information of a driver of a vehicle; receiving an indication that the driver wants to activate a feature of the vehicle; determining whether the driver is qualified to activate the feature based on the identifying information; in response to determining that the driver is not qualified to activate the feature, inhibiting activation of the feature and causing a user interface to be presented that indicates that the feature cannot be used; and in response to determining that the driver is qualified to activate the feature, activating the feature.

In accordance with some embodiments of the disclosed subject matter, a system for controlling access to vehicle features is provided, the system comprising: means for determining identifying information of a driver of a vehicle; means for receiving an indication that the driver wants to activate a feature of the vehicle; means for determining whether the driver is qualified to activate the feature based on the identifying information; in response to determining that the driver is not qualified to activate the feature, means for inhibiting activation of the feature and means for causing a user interface to be presented that indicates that the feature cannot be used; and in response to determining that the driver is qualified to activate the feature, means for activating the feature.

In some embodiments, the feature allows a hardware processor to control steering of the vehicle.

In some embodiments, the means for determining identifying information of the driver of the vehicle comprises is based on at least one of facial recognition of the driver of the vehicle, a key fob used to access the vehicle, and user login information.

In some embodiments, the means for determining whether the driver is qualified to activate the feature comprises means for determining whether the feature has been changed since a previous time the driver was indicated as qualified to activate the feature.

In some embodiments, the user interface that indicates that the feature cannot be used further indicates a change to the feature in response to determining that the feature has been changed since the previous time the driver was indicated as qualified to activate the feature.

In some embodiments, the user interface that indicates that the feature cannot be used includes a selectable input that, when selected, causes presentation of information related to the feature to be initiated.

In some embodiments, the presentation of information related to the feature comprises at least one user interface that includes information related to the feature that is presented while the vehicle is stationary and at least one user interface that includes information related to the feature that is presented while the vehicle is in motion and while the feature is activated.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
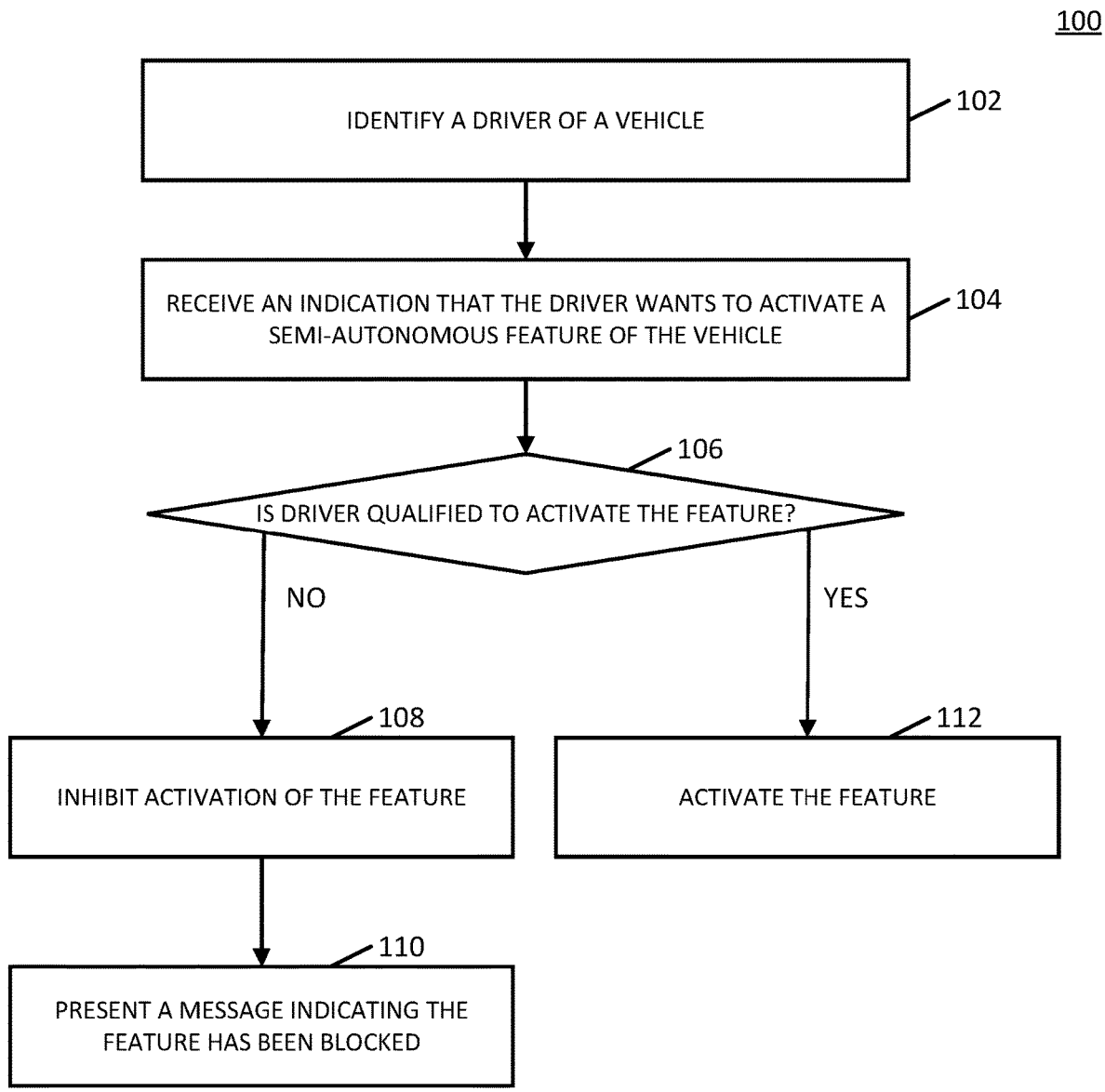
FIG. 1 shows an example of a process for controlling access to vehicle features in accordance with some embodiments of the disclosed subject matter.

In accordance with various embodiments, mechanisms (which can include methods, systems, and media) for controlling access to vehicle features are provided.

In some embodiments, the mechanisms described herein can determine whether an autonomous or semi-autonomous feature of a vehicle can be activated by a driver of the vehicle. In some embodiments, an autonomous or semi-autonomous feature can be any suitable feature that automates steering of a vehicle, acceleration/deceleration of a vehicle, and/or any other suitable function of a vehicle. For example, in some embodiments, an autonomous or semi-autonomous feature of a vehicle can control steering of the vehicle if the vehicle begins to drift out of a lane, can cause the vehicle to brake in response to detecting an object in front of the vehicle, can adjust a speed of the vehicle while the vehicle is utilizing cruise control, can park the vehicle, can control steering and/or acceleration/deceleration of the vehicle while driving in traffic, and/or can perform any other suitable autonomous or semi-autonomous function.

In some embodiments, in response to receiving an indication from a driver of a vehicle that the driver wants to activate a particular autonomous or semi-autonomous feature, the mechanisms can determine whether the driver is qualified to use the indicated feature. In some embodiments, in response to determining that the driver is not qualified to activate the indicated feature, the mechanisms can cause the feature to be inhibited or to remain inactivated. Conversely, in some embodiments, in response to determining that the driver is qualified to activate the indicated feature, the mechanisms can cause the feature to be activated.

In some embodiments, the mechanisms can determine whether a driver of a vehicle is qualified to activate a particular autonomous or semi-autonomous feature using any suitable technique or combination of techniques. For example, in some embodiments, the mechanisms can determine whether the driver is included in a group of drivers who are qualified to activate the feature. As a more particular example, in some embodiments, the mechanisms can determine whether a driver is included in the group of drivers who are qualified to activate the feature based on any suitable information or techniques, such as by determining whether an identifier associated with the driver is included in a group of identifiers corresponding to drivers qualified to activate the feature. As a specific example, in some embodiments, the mechanisms can determine whether an image capturing a face of a driver is included in a group of images of faces of qualified drivers. As another specific example, in some embodiments, the mechanisms can determine identifying information corresponding to the driver based on a key fob used to access the vehicle, and can determine whether a driver associated with the identifying information is qualified to activate the feature. As another example, in some embodiments, the mechanisms can administer a test related to the autonomous or semi-autonomous feature to a driver. As a more particular example, in some embodiments, the mechanisms can present one or more user interfaces that include questions relevant to the feature (e.g., what road conditions the feature can be used while driving on, what weather conditions are required for sensors of the vehicle to provide accurate information while using the feature, and/or any other suitable questions), and can determine that the driver is qualified to activate the feature if the driver answers more than a predetermined percentage (e.g., more than 70%, and/or any other suitable percentage) of the questions correctly). As yet another example, in some embodiments, the mechanisms can determine whether a driver has been presented with particular information related to the feature.

In some embodiments, the mechanisms can additionally present information related to an autonomous or semi-autonomous feature of a vehicle. In some embodiments, the information can include information to be presented while a vehicle is stationary and/or information that is to be presented while a vehicle is in motion and while a feature is activated (that is, while the feature is being used in a restricted mode), as described in more detail in connection with FIG. 2. In some embodiments, information presented while a vehicle is stationary can include information such as information related to settings associated with a feature, information indicating techniques to activate a feature, information indicating warnings associated with a feature, and/or any other suitable information. In some embodiments, information presented while a vehicle is in motion and while a feature is activated can include information such as indications of objects detected by sensors of the vehicle in connection with use of the feature, demonstrations of consequences of changing settings associated with the feature, and/or any other suitable information. In some embodiments, the mechanisms can cause an indication that a driver has been presented with all information related to a particular feature to be stored. In some such embodiments, the mechanisms can then allow the feature to be used in an operational mode, as described above.

Turning to FIG. 1, an example 100 of a process for controlling access to vehicle features is shown in accordance with some embodiments of the disclosed subject matter. In some embodiments, blocks of process 100 can be implemented on a computer associated with a vehicle, as shown in and described below in connection with FIG. 3.

Process 100 can begin by identifying a driver of a vehicle at 102. In some embodiments, an identity of the driver can be determined in any suitable manner and based on any suitable information. For example, in some embodiments, the driver can log into a user account corresponding to the driver, wherein the user account is associated with a manufacturer of the vehicle, an entity providing the vehicle (e.g., a rental car company, etc.), and/or any other suitable entity. As another example, in some embodiments an identity of the driver can be determined based on information associated with a key fob used to unlock and/or start the vehicle. As a more particular example, in some embodiments, an identity of the driver can be determined based on an identifier used by the key fob to unlock and/or start the vehicle (e.g., a personal identification number, or PIN, and/or any other suitable identifier). As yet another example, in some embodiments, an identity of the driver can be determined by capturing an image of a face of the driver and using any suitable image recognition techniques or facial recognition techniques to identify the driver. As still another example, in some embodiments, an identity of the driver can be determined using any other suitable biometric information (e.g., a fingerprint, and/or any other suitable biometric information). As still another example, in some embodiments, an identity of the driver can be determined using information from the driver's phone or other mobile device (e.g., via a BLUETOOTH connection between the phone and the vehicle, and/or in any other suitable manner).

At 104, process 100 can receive an indication that the driver of the vehicle wants to activate an autonomous or semi-autonomous feature of the vehicle. For example, in some embodiments, an autonomous or semi-autonomous feature of the vehicle can include any suitable feature where the vehicle automatically adjusts speed and/or steering of the vehicle. As a more particular example, in some embodiments, an autonomous or semi-autonomous feature of the vehicle can include adaptive cruise control, lane keeping assistance, automatic steering and speed control in particular conditions (e.g., in traffic driving below a predetermined speed limit, while driving on a highway, and/or any other suitable conditions), and/or one or more other suitable automated or semi-automated features. In some embodiments, process 100 can receive the indication that the driver of the vehicle wants to activate a particular feature in any suitable manner. For example, in some embodiments, process 100 can receive the indication by determining that a particular button (e.g., located on a steering wheel of the vehicle, located on a dashboard of the vehicle, and/or any other suitable button) has been pressed. As another example, in some embodiments, process 100 can determine that a selectable input to activate the feature has been selected, for example, on a user interface presented on a display of the vehicle (e.g., a dashboard display, and/or any other suitable display).

At 106, process 100 can determine whether the driver of the vehicle is qualified to activate the feature indicated at block 104. Additionally or alternatively, in some embodiments, process 100 can determine whether the feature has been updated and/or changed since a driver was last indicated as being qualified to activate the feature. In some embodiments, process 100 can determine whether the driver of the vehicle is qualified to access the feature indicated at block 104 using any suitable technique or combination of techniques. For example, in some embodiments, process 100 can determine whether identifying information corresponding to the driver is included in a database or list of drivers qualified to activate a particular feature. As a more particular example, in some embodiments, process 100 can use identifying information such as an image of a face of the driver, an identifier associated with a key fob used to access the vehicle, identifying information related to a BLUETOOTH connection between a mobile device of the driver and the vehicle, and/or any other suitable identifying information as well as an indication of the feature as inputs to a database that indicates whether the driver corresponding to the identifying information is qualified to activate the indicated feature.

As another example, in some embodiments, process 100 can determine whether the driver of the vehicle is qualified to access the feature indicated at block 104 by administering a test to the driver prior to allowing the driver to activate the feature. As a more particular example, in some embodiments, process 100 can present one or more questions (e.g., via user interfaces presented on a display of the vehicle) that are related to the feature. As a specific example, in some embodiments, process 100 can present a question that asks about road conditions (e.g., whether the feature is to be used only on a highway, whether the feature is to be used only while driving below a predetermined speed limit, and/or any other suitable road conditions) the feature is to be used with. As another specific example, in some embodiments, process 100 can present a question that asks about weather conditions (e.g., whether the feature can be used in light rain, whether the feature can be used in heavy fog, whether the feature can only be used on a clear day, and/or any other suitable weather conditions) the feature is to be used during. As yet another specific example, in some embodiments, process 100 can present a question that asks about a level of attention required of the driver while using the feature (e.g., whether the driver can safely take their hands off the steering wheel, whether the driver must be prepared to respond to traffic lights, and/or any other suitable question related to a level of attention). In some embodiments, answers to the questions can be received in any suitable manner, such as via a selection of one answer from a group of potential answers, via a spoken answer received by a microphone associated with the vehicle, and/or in any other suitable manner. In some embodiments, process 100 can determine that the driver of the vehicle is qualified to activate the feature if the driver responds correctly to more than a predetermined number or percentage of questions. Conversely, in some embodiments, process 100 can determine that the driver of the vehicle is not qualified to activate the feature if the driver responds correctly to fewer than a predetermined number or percentage of questions. In some such embodiments, process 100 can present a message indicating available information related to the feature, as described in more detail below in connection with FIG. 2.

As yet another example, in some embodiments, process 100 can determine whether the driver of the vehicle is qualified to access the feature indicated at block 104 by determining whether the driver has previously been presented with information related to the feature. In some such embodiments, process 100 can determine that the driver is qualified to access the feature if the driver been presented with all of the available information (or more than a particular percentage of the available information) related to the feature. Conversely, in some embodiments, process 100 can determine that the driver is not qualified to access the feature if the driver has not been presented with all of the information related to the feature (or has been presented with less than a particular percentage of the available information). Additionally or alternatively, in some embodiments, process 100 can determine that the driver is not qualified to activate the feature if the feature has been changed and/or updated in any suitable manner since the driver was previously presented with the information. In some embodiments, process 100 can determine whether the driver has been presented with information related to the feature using any suitable technique or combination of techniques. For example, in some embodiments, process 100 can query a database using the identifying information corresponding to the driver (e.g., as described above in connection with block 102) and the indication of the feature selected at block 104. In some such embodiments, the database can store indications of drivers who have previously been presented with information related to different autonomous or semi-autonomous features.

If, at 106, process 100 determines that the driver is not qualified to access the feature ("no" at 106), process 100 can proceed to block 108 and can inhibit activation of the feature. For example, in an instance where the feature indicated at block 104 uses automated steering of the vehicle, process 100 can inhibit automation of steering, thereby requiring that the driver of the vehicle maintain control of steering of the vehicle. As another example, in an instance where the feature indicated at block 104 uses automated acceleration/deceleration of the vehicle, process 100 can inhibit automation of acceleration/deceleration, thereby requiring that the driver of the vehicle maintain control of acceleration/deceleration of the vehicle.

Process 100 can proceed to block 110 and can present a message indicating that the feature has been blocked. In some embodiments, the message can indicate any suitable information. For example, in some embodiments, the message can indicate that the driver has not been recognized as a driver qualified to use the feature based on the identifying information. As another example, in some embodiments, the message can indicate that the driver did not pass a test related to the feature (e.g., as described above in connection with block 106). As yet another example, in some embodiments, the message can indicate that the feature has been blocked because the driver has not yet been presented with all available information (or has not yet been presented with more than a particular percentage of available information) related to the feature. As still another example, in some embodiments, the message can indicate that aspects of the feature have changed and/or have been updated in any suitable manner, and that the feature has been blocked because the driver has not been indicated as qualified to use the feature since the feature was updated. As a more particular example, in some embodiments the message can indicate a particular aspect of the feature that has been changed (e.g., that particular settings have changed, that particular warning tones or indications have changed, and/or any other suitable changes). In some embodiments, the message can additionally include information related to use of the feature. For example, in some embodiments, the message can include a selectable input, that, when selected, causes an information presentation related to the feature to be initiated. More detailed information and techniques related to presenting information related to a feature of a vehicle are shown in and described below in connection with FIG. 2.

Referring back to block 106, if, at 106, process 100 determines that the driver is qualified to activate the feature indicated at block 104 ("yes" at 106), process 100 can proceed to block 112 and can activate the feature. For example, in an instance where the feature indicated at block 104 uses automated steering of the vehicle, process 100 can cause a vehicle computer associated with the vehicle to begin controlling steering of the vehicle. As another example, in an instance where the feature indicated at block 104 uses automated acceleration/deceleration of the vehicle, process 100 can cause a vehicle computer associated with the vehicle to begin controlling acceleration/deceleration of the vehicle.

Note that, in some embodiments, process 100 can determine whether the feature indicated at block 104 is a safety feature that is to always be activated. For example, in some embodiments, process 100 can determine whether the feature relates to collision detection, automatic emergency braking, and/or any other suitable safety features. In some such embodiments, process 100 can determine that the feature is to be activated regardless of whether the driver has been determined to be qualified to use the feature or not.

Figure 2:
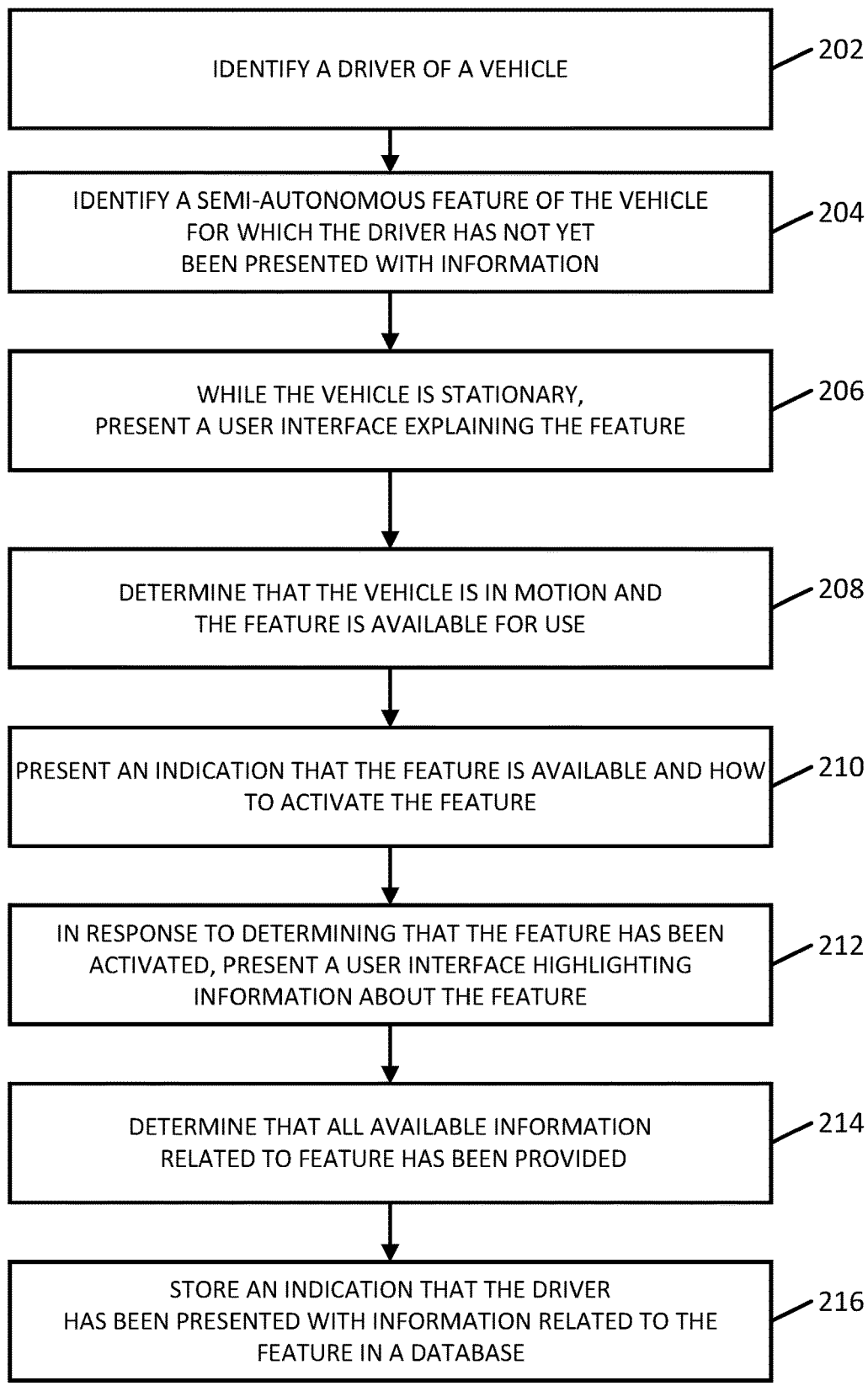
FIG. 2 shows an example of a process for providing information related to an autonomous and/or semi-autonomous feature of a vehicle to a driver of the vehicle in accordance with some embodiments of the disclosed subject matter.

Turning to FIG. 2, an example 200 of a process for presenting information to a driver of a vehicle related to an autonomous and/or semi-autonomous feature of the vehicle is shown in accordance with some embodiments of the disclosed subject matter. In some embodiments, blocks of process 200 can be executed on a vehicle computer associated with the vehicle.

Process 200 can begin by identifying a driver of a vehicle at 202. Similarly to as described above in connection with block 102 of FIG. 1, process 200 can identify the driver of the vehicle using any suitable technique or combination of techniques. For example, in some embodiments, the driver can log into a user account corresponding to the driver, wherein the user account is associated with a manufacturer of the vehicle, an entity providing the vehicle (e.g., a rental car company, etc.), and/or any other suitable entity. As another example, in some embodiments an identity of the driver can be determined based on information associated with a key fob used to unlock and/or start the vehicle. As a more particular example, in some embodiments, an identity of the driver can be determined based on an identifier used by the key fob to unlock and/or start the vehicle (e.g., a personal identification number, or PIN, and/or any other suitable identifier).

At 204, process 200 can identify an autonomous and/or semi-autonomous feature of the vehicle. For example, as described above, in some embodiments, the feature can be any suitable feature that uses automated control of steering of the vehicle and/or acceleration/deceleration of the vehicle. As a more particular example, in some embodiments, the feature can be a feature that relates to driving the vehicle in particular conditions (e.g., in traffic below a predetermined speed limit, on a highway, and/or in any other suitable condition), lane keeping assistance, adaptive cruise control, and/or any other suitable feature. In some embodiments, process 200 can identify a feature for which the driver of the vehicle has not yet been presented with information and/or has not yet been presented with all available information (or more than a particular percentage of available information). Additionally or alternatively, in some embodiments, process 200 can identify a feature that has been changed and/or updated since the driver previously was presented with information related to the feature.

In some embodiments, process 200 can identify the feature using any suitable technique or combination of techniques. For example, in some embodiments, process 200 can transmit a query to a server (e.g., server 302 as shown in and described below in connection with FIG. 3) that includes identifying information corresponding to the driver, and can receive a response to the query from the server that indicates a feature for which the driver has not been presented with information, has not yet been presented with all available information (or more than a particular percentage of available information), and/or has been updated since the driver was last presented with information.

Figure 5A:
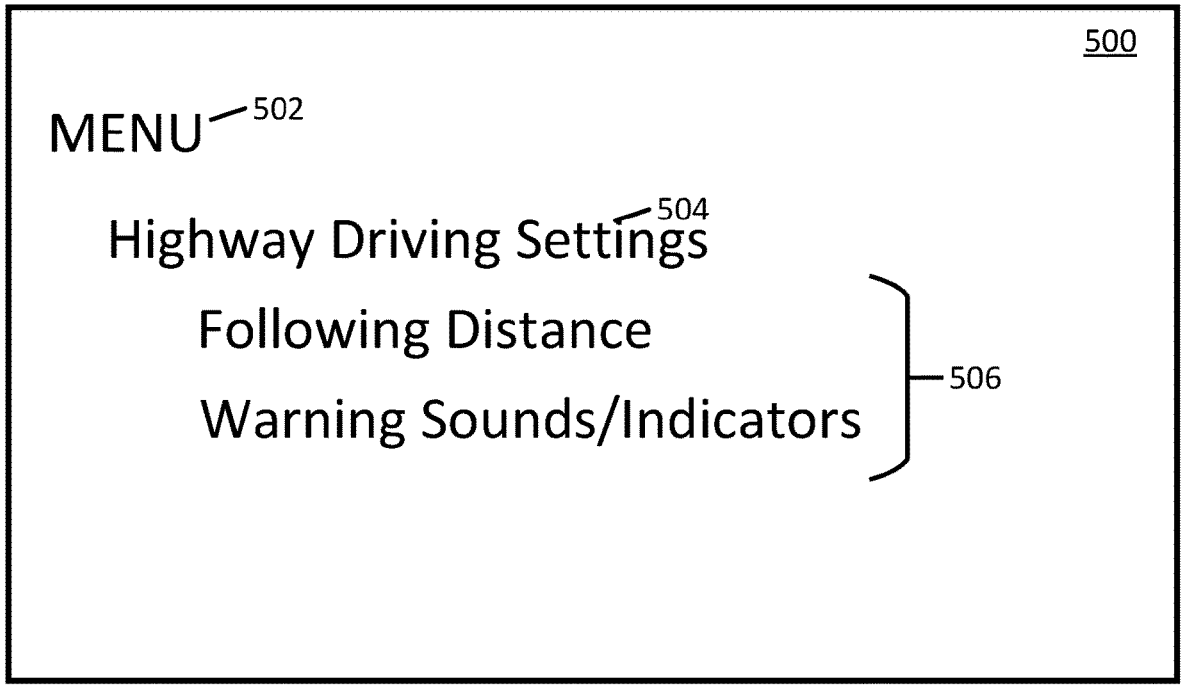
FIGS. 5A and 5B show examples of user interfaces for providing information on a vehicle computer while the vehicle is stationary in accordance with some embodiments of the disclosed subject matter.
Figure 5B:
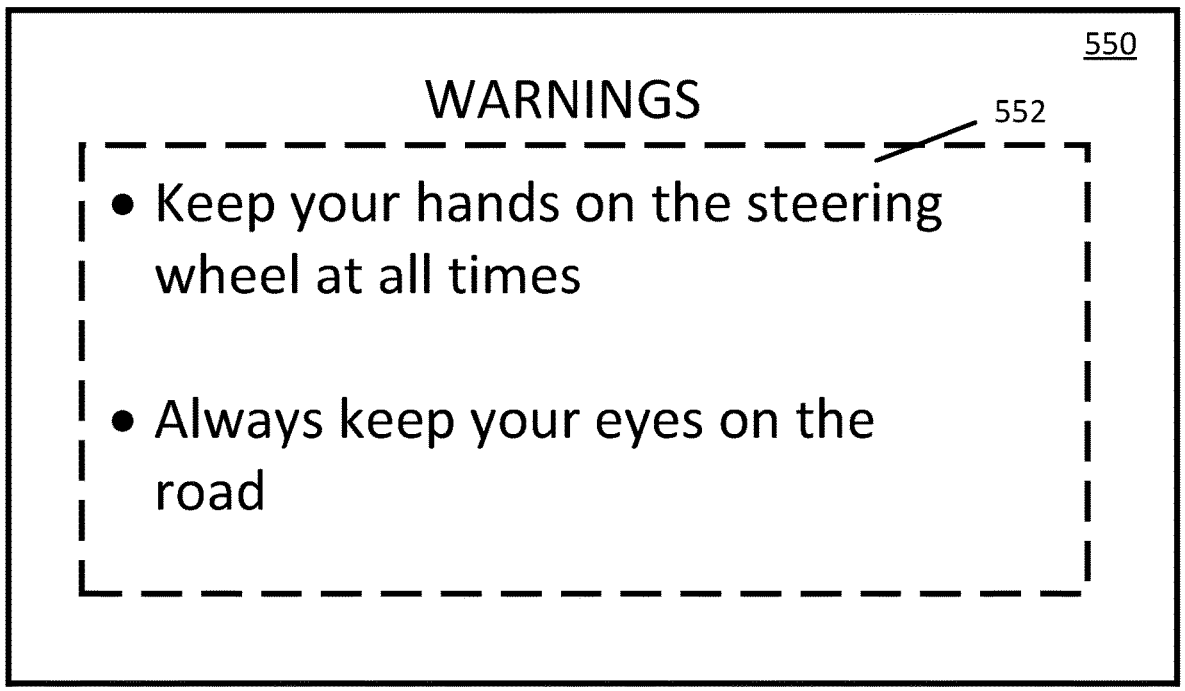

Process 200 can present at least one user interface that presents information related to the identified feature at 206. In some embodiments, process 200 can present the at least one user interface while the vehicle is stationary. In some embodiments, the user interface can include any suitable information, such as explanations of settings related to the feature, how to change settings related to the feature, an explanation of how to activate the feature, an explanation of how to deactivate the feature, an indication of any suitable warnings about the feature, information indicating objects the vehicle will not detect and/or respond to while the feature is in use (e.g., traffic lights, vehicles merging into a lane, and/or any other suitable objects), an illustration of visuals that indicate where information will appear on a display of the vehicle while the feature is in use, and/or any other suitable information. FIGS. 5A and 5B (described below) show examples of user interfaces that can be presented at block 206. Note that, FIGS. 5A and 5B are shown and described below merely as examples, and, in some embodiments, any suitable user interfaces that present information related to the identified feature can be presented at block 206.

Turning to FIG. 5A, an example 500 of a user interface 500 for presenting information about settings related to the feature is shown in accordance with some embodiments of the disclosed subject matter. As illustrated, in some embodiments, user interface 500 can provide information about settings related to the feature. In some embodiments, user interface 500 can include a menu 502, a feature section 504, and a group of settings 506. In some embodiments, menu 502 can be a menu for accessing any suitable settings, such as settings for one or more autonomous or semi-autonomous features associated with the vehicle, and/or any other suitable settings associated with the vehicle. In some embodiments, feature section 504 can be a menu item corresponding to a particular autonomous or semi-autonomous feature associated with the vehicle. In some embodiments, group of settings 506 can include any suitable settings relevant to the feature indicated in feature section 504. For example, as shown in FIG. 5A, group of settings 506 can include settings for changing a following distance (e.g., a distance between the vehicle and a second vehicle in front of the vehicle), settings for modifying sounds or indicators associated with warnings presented by the vehicle while the feature is in use, and/or any other suitable settings. Although not shown in FIG. 5A, in some embodiments, user interface 500 can include any suitable information or explanations associated with settings. For example, in some embodiments, a following distance setting included in group of settings 506 can include information (e.g., a text bubble, and/or information presented in any other suitable manner) that indicates an explanation of the setting, consequences of changing the setting, and/or any other suitable information.

Turning to FIG. 5B, an example 550 of a user interface for presenting safety information related to the autonomous or semi-autonomous feature is shown in accordance with some embodiments of the disclosed subject matter. As illustrated, in some embodiments, user interface 500 can include information 552, which can indicate any suitable safety information. For example, in some embodiments, information 552 can indicate a level of awareness required from a driver of the vehicle (e.g., the driver must keep their hands on the steering wheel, the driver must always be looking at the road, the driver must be ready to take control of the vehicle when indicated, the driver must respond to traffic lights, and/or any other suitable information). As another example, in some embodiments, information 552 can indicate weather conditions or road conditions in which the autonomous or semi-autonomous feature is not to be used (e.g., in rain, in traffic driving below a predetermined speed limit, on non-highway roads, on highways, and/or in any other suitable conditions).

Referring back to FIG. 2, at block 208, process 200 can determine that the vehicle is in motion and that the autonomous or semi-autonomous feature identified at block 204 is available for use. In some embodiments, process 200 can determine that the autonomous or semi-autonomous feature is available for use based on any suitable information or criteria. For example, in an instance where the feature can only be used during particular weather conditions (e.g., no fog, no rain, and/or any other suitable weather conditions), process 200 can determine that the weather criteria are satisfied. As another example, in an instance where the feature can only be used when the vehicle is being driven above a predetermined speed or below a predetermined speed, process 200 can determine that the speed criteria are satisfied. As yet another example, in an instance where the feature can only be used when the vehicle is on a particular type of road (e.g., on a highway, on a non-highway, and/or any other suitable type of road), process 200 can determine that the vehicle is currently on the particular type of road. As still another example, in an instance where the feature can only be used when particular visual criteria are satisfied (e.g., lane lines are clearly visible, road signs are clearly visible, and/or any other suitable visual criteria), process 200 can determine that the visual criteria are currently satisfied using camera images from any suitable cameras associated with the vehicle. In some embodiments, process 200 can determine whether the criteria have been satisfied using any suitable information, such as information from a lidar system associated with the vehicle, information from a radar system associated with the vehicle, information from one or more cameras associated with the vehicle, information from a speedometer associated with the vehicle, and/or any other suitable systems or sensors associated with the vehicle. For example, in some embodiments, process 200 can perform a system diagnostic check to determine that all sensors used by the autonomous or semi-autonomous feature are functioning properly for safe use of the feature.

At 210, process 200 can present an indication that the autonomous or semi-autonomous feature identified at block 204 is available and information indicating how to activate the feature. For example, in some embodiments, process 200 can present a message on a display associated with the vehicle (e.g., a heads-up display, and/or any other suitable display) indicating that the feature is available and how to activate the feature (e.g., by pressing a particular button, and/or in any other suitable manner). As another example, in some embodiments, process 200 can present the message as a spoken message using speakers associated with the vehicle.

At 212, process 200 can determine that a driver of the vehicle has activated the feature, and, in response to determining that the feature has been activated, can present at least one user interface presenting additional information relating to the feature. In some embodiments, process 200 can determine that the feature has been activated using any suitable information and/or technique(s). For example, in some embodiments, process 200 can determine that a selectable input or button (e.g., on a steering wheel of the vehicle, on a dashboard of the vehicle, a selectable input presented on a user interface of a display of the vehicle, and/or any other suitable selectable input or button) associated with the feature has been selected. In some embodiments, the information presented in response to determining that the feature has been activated can be presented while the vehicle is in motion. Additionally, in some embodiments, the information presented can include information relevant to a current context of the vehicle, as shown in and described below in connection with FIGS. 6A and 6B.

Figure 6A:
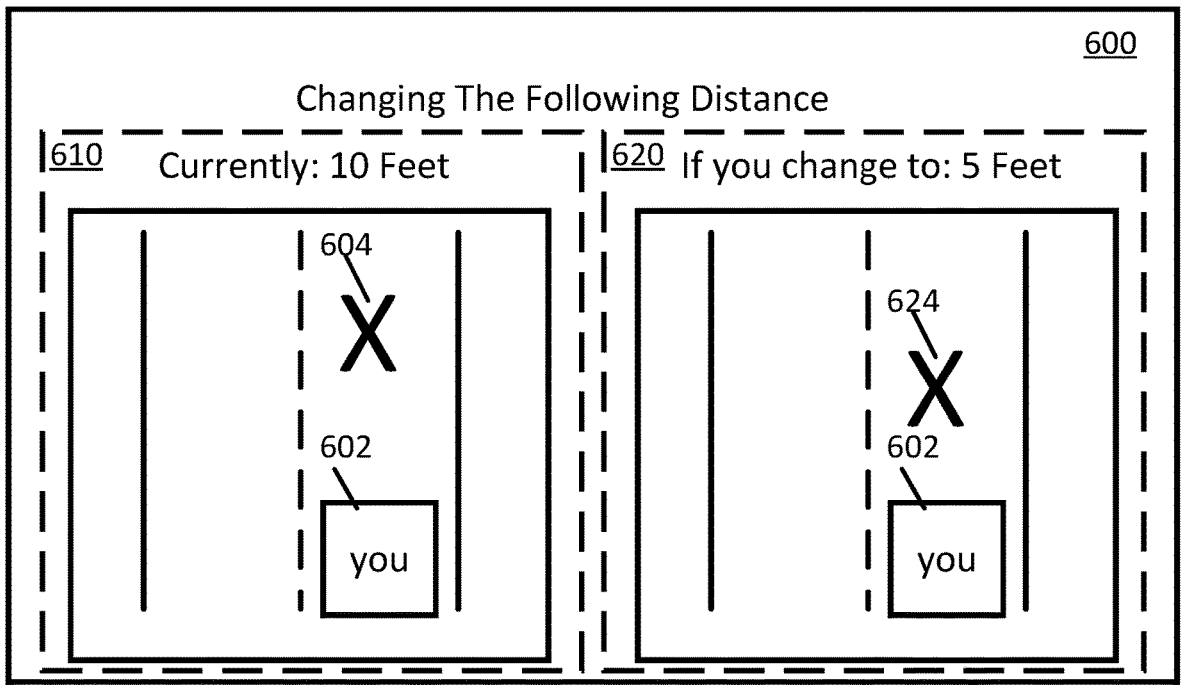
FIGS. 6A and 6B show examples of user interfaces for providing information on a vehicle computer while the vehicle is in motion in accordance with some embodiments of the disclosed subject matter.

Turning to FIG. 6A, an example 600 of a user interface for presenting information related to changing a setting associated with an autonomous or semi-autonomous feature of a vehicle is shown in accordance with some embodiments of the disclosed subject matter. For example, as illustrated in FIG. 6A, in some embodiments, user interface 600 can include information related to changing a particular setting associated with the feature, such as a following distance between the vehicle and a second vehicle in front of the vehicle. Continuing with this example, user interface 600 can include a first portion 610 that indicates a current setting of the feature, and second portion 620 that can indicate consequences of changing the setting. As a more particular example, first portion 610 can indicate a current position 602 of the vehicle and a current position 604 of a second vehicle in front of the vehicle at a current following distance (e.g., 150 feet, 200 feet, and/or any other suitable following distance). Continuing with this example, second portion 620 can indicate a current position 602 of the vehicle and a predicted position 624 of the second vehicle in front of the vehicle if the following distance setting were changed to a different value (e.g., 140 feet, 190 feet, and/or any other suitable distance). Note that, following distance is used merely as an example, and, in some embodiments, user interface 600 can present information related to changing any other suitable setting associated with an autonomous or semi-autonomous feature of the vehicle.

Figure 6B:
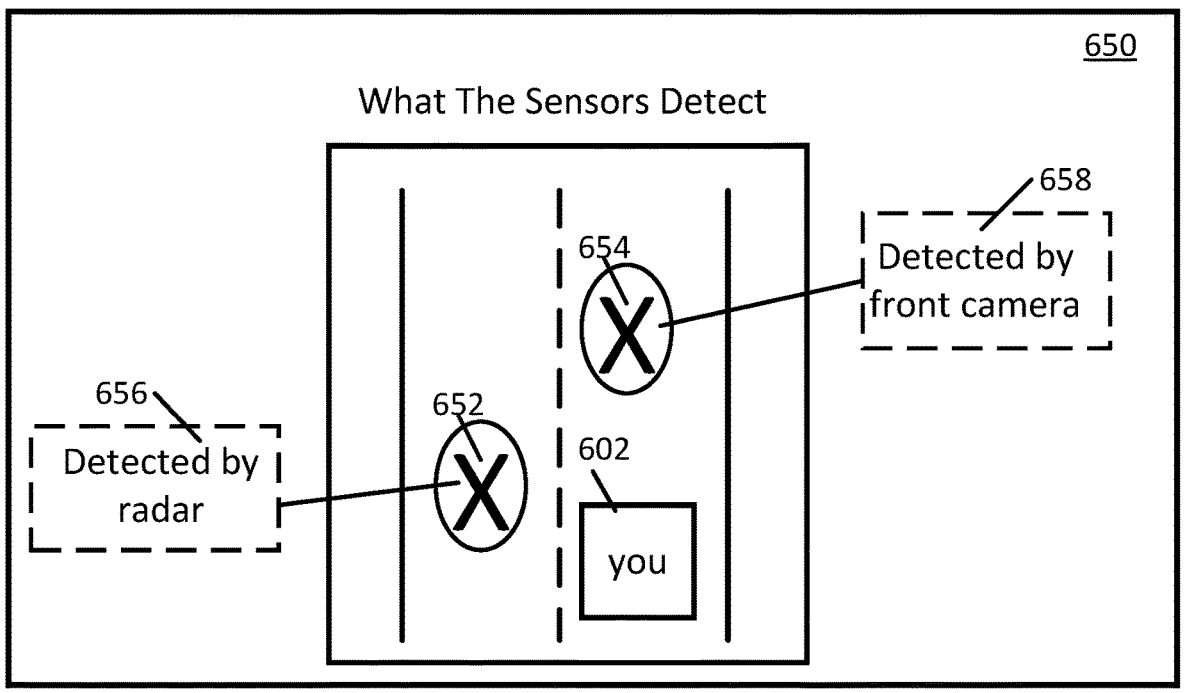

Turning to FIG. 6B, an example 650 of a user interface for presenting information indicating objects currently detected by sensors of the vehicle during use of the autonomous or semi-autonomous feature is shown in accordance with some embodiments of the disclosed subject matter. As illustrated, user interface 650 can include current position 602 of the vehicle, as well as other objects that have been detected, such as a second vehicle 652, a third vehicle 654, and/or any other suitable objects. Additionally or alternatively, in some embodiments, user interface 650 can include indications 656 and/or 658 that indicate sensors or other systems of the vehicle used to detect second vehicle 652 and/or third vehicle 654, respectively. For example, in some embodiments, indications 656 and/or 658 can indicate that objects were detected using a radar system, a camera of the vehicle (e.g., a front camera, a rear camera, a side camera, and/or any other suitable camera), a lidar system, and/or any other suitable sensors or systems.

Note that, the information presented in user interface 600 and 650 of FIGS. 6A and 6B are shown merely as examples, and, in some embodiments, process 200 can present any other suitable information related to an activated autonomous or semi-autonomous feature of the vehicle at block 212. For example, in some embodiments, process 200 can present information indicating why a particular feature is available (e.g., that current weather conditions are clear, that lane lines are clearly visible by a camera system of the vehicle, and/or any other suitable information). As another example, in some embodiments, process 200 can present information indicating objects to pay attention to, such as vehicles in a blind spot, a vehicle changing lanes, and/or any other suitable objects or other information.

Note that, in some embodiments, a driver may be required to acknowledge any of the user interfaces described above in connection with blocks 206 and/or 212. For example, in some embodiments, a user interface may include a selectable input that must be selected for process 200 to determine that the driver has viewed the information included in the user interface related to the feature.

Referring back to FIG. 2, at 214, process 200 can determine that a driver of the vehicle has been presented with all available appropriate information (or more than an adequate amount of information) related to the autonomous or semi-autonomous feature. In some embodiments, process 200 can determine that all available appropriate information related to the feature (or more than an adequate amount of available information) has been presented based on any suitable information. For example, in some embodiments, process 200 can determine that information related to the feature to be presented while the vehicle is stationary (e.g., as described above in connection with block 206) and/or information related to the feature to be presented while the vehicle is in motion (e.g., as described above in connection with block 212) has been presented. As a more particular example, in some embodiments, process 200 can determine that all available information to be presented while the vehicle is stationary has been presented when a driver has been presented with and/or has acknowledged in any suitable manner all user interfaces presenting information related to the feature that are to be presented while the vehicle is stationary (or more than a predetermined number of user interfaces that are to be presented while the vehicle is stationary have been presented). As another more particular example, in some embodiments, process 200 can determine that all available information to be presented while the vehicle is in motion has been presented when a vehicle has been driven in a restricted mode while the feature has been activated for more than a predetermined time (e.g., more than ten minutes, more than an hour, and/or any other suitable time) and/or for more than a predetermined distance (e.g., more than ten miles, more than fifty miles, and/or any other suitable distance). Note that, in some such embodiments, the predetermined time or distance can be determined based on the feature. For example, in some embodiments, a predetermined distance can be relatively higher for a feature to be used during highway driving relative to a feature to be used in heavy traffic. As yet another more particular example, in some embodiments, process 200 can determine that all information to be presented while the vehicle is in motion has been completed when all user interfaces associated with a feature have been presented and/or when all information associated with the feature has been highlighted (or when more than a particular percentage of user interfaces have been presented and/or more than a particular percentage of information associated with the feature has been highlighted). As a specific example, in an instance where a particular feature is associated with two user interfaces to be presented while the vehicle is in motion and while the feature is being used, process 200 can determine that all available information related to the feature has been presented in response to determining that the two user interfaces have been presented.

In some embodiments, in response to determining that information related to the feature has been presented, process 200 can present an indication indicating that information related to the feature has been presented. For example, in some embodiments, process 200 can present a message on a display associated with the vehicle (e.g., a dashboard display, and/or any other suitable display) indicating that all information related to the feature has been presented. As another example, in some embodiments, process 200 can present a spoken messaging indicating that all information related to the feature has been presented using speakers associated with the vehicle. Additionally, in some embodiments, process 200 can additionally present information indicating how to activate a restricted mode associated with the feature again (e.g., to be presented with user interfaces and/or information while the vehicle is in motion and while the feature is in use, as described above in connection with block 212).

At 216, process 200 can store an indication that the driver has been presented with all available information (or more than a particular percentage of information) related to the autonomous or semi-autonomous feature of the vehicle. For example, in some embodiments, process 200 can transmit a message to a server (e.g., server 302 as shown in and described below in connection with FIG. 3) that includes an indication of an identity of the driver and an indication of the feature, and the server can store the indication that the driver has been presented with information related to the feature in a database stored on the server. In some embodiments, the indication that the driver has been presented with information related to the feature can be used to allow the driver to use the feature while not in a restricted mode (that is, while in an operational mode), as described above in more detail in connection with FIG. 1.

Figure 3:
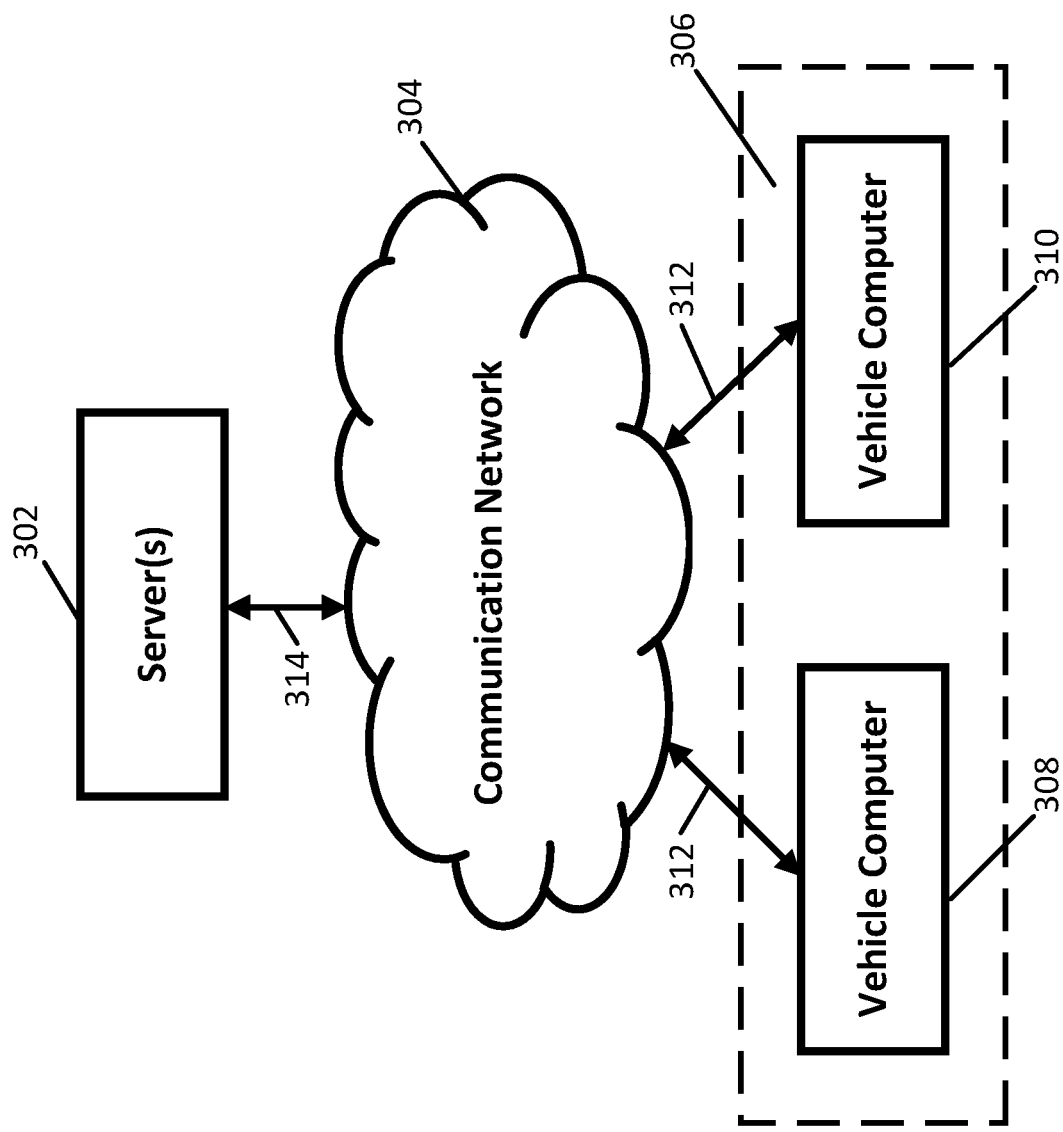
FIG. 3 shows a schematic diagram of an illustrative system suitable for implementation of mechanisms described herein for controlling access to vehicle features in accordance with some embodiments of the disclosed subject matter.

Turning to FIG. 3, an example 300 of hardware for controlling access to vehicle features that can be used in accordance with some embodiments of the disclosed subject matter is shown. As illustrated, hardware 300 can include a server 302, a communication network 304, and/or one or more vehicle computers 306, such as vehicle computers 308 and 310.

Server(s) 302 can be any suitable server(s) for storing any suitable data, programs, and/or any other suitable information. For example, in some embodiments, server(s) 302 can store indications of drivers who are qualified to activate particular autonomous or semi-autonomous features of vehicles. As a more particular example, in some embodiments, server(s) 302 can store a database that indicates users that have previously driven a particular model or type of a vehicle. As another more particular example, in some embodiments, server(s) 302 can store a database that indicates users that have previously been trained on particular features of a particular model or type of a vehicle. As another example, in some embodiments, server(s) 302 can store information used to present information related to a particular autonomous or semi-autonomous feature. As a more particular example, in some embodiments, server(s) 302 can store user interfaces used for presenting information related to a particular feature, and can transmit instructions to present the user interfaces to one or more vehicle computers.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. Vehicle computers 306 can be connected by one or more communications links (e.g., communications links 312) to communication network 304 that can be linked via one or more communications links (e.g., communications links 314) to server(s) 302. The communications links can be any communications links suitable for communicating data among vehicle computers 306 and server(s) 302 such as network links, dial-up links, wireless links, hard-wired links, any other suitable communications links, or any suitable combination of such links.

Vehicle computers 306 can include any one or more computing devices operating on a vehicle, such as a car, truck, etc. In some embodiments, vehicle computers 306 can perform any suitable functions, such as the functions described above in connection with FIGS. 1 and 2. For example, in some embodiments, vehicle computers 306 can determine identifying information of a driver of the vehicle, inhibit particular features of the vehicle based on the identifying information of the driver, present user interfaces related to a particular feature of the vehicle, and/or perform any other suitable functions.

Although server(s) 302 is illustrated as one device, the functions performed by server(s) 302 can be performed using any suitable number of devices in some embodiments. For example, in some embodiments, multiple devices can be used to implement the functions performed by server(s) 302.

Although two vehicle computers 308 and 310 are shown in FIG. 3 to avoid over-complicating the figure, any suitable number of vehicle computers, and/or any suitable types of vehicle computers, can be used in some embodiments.

Figure 4:
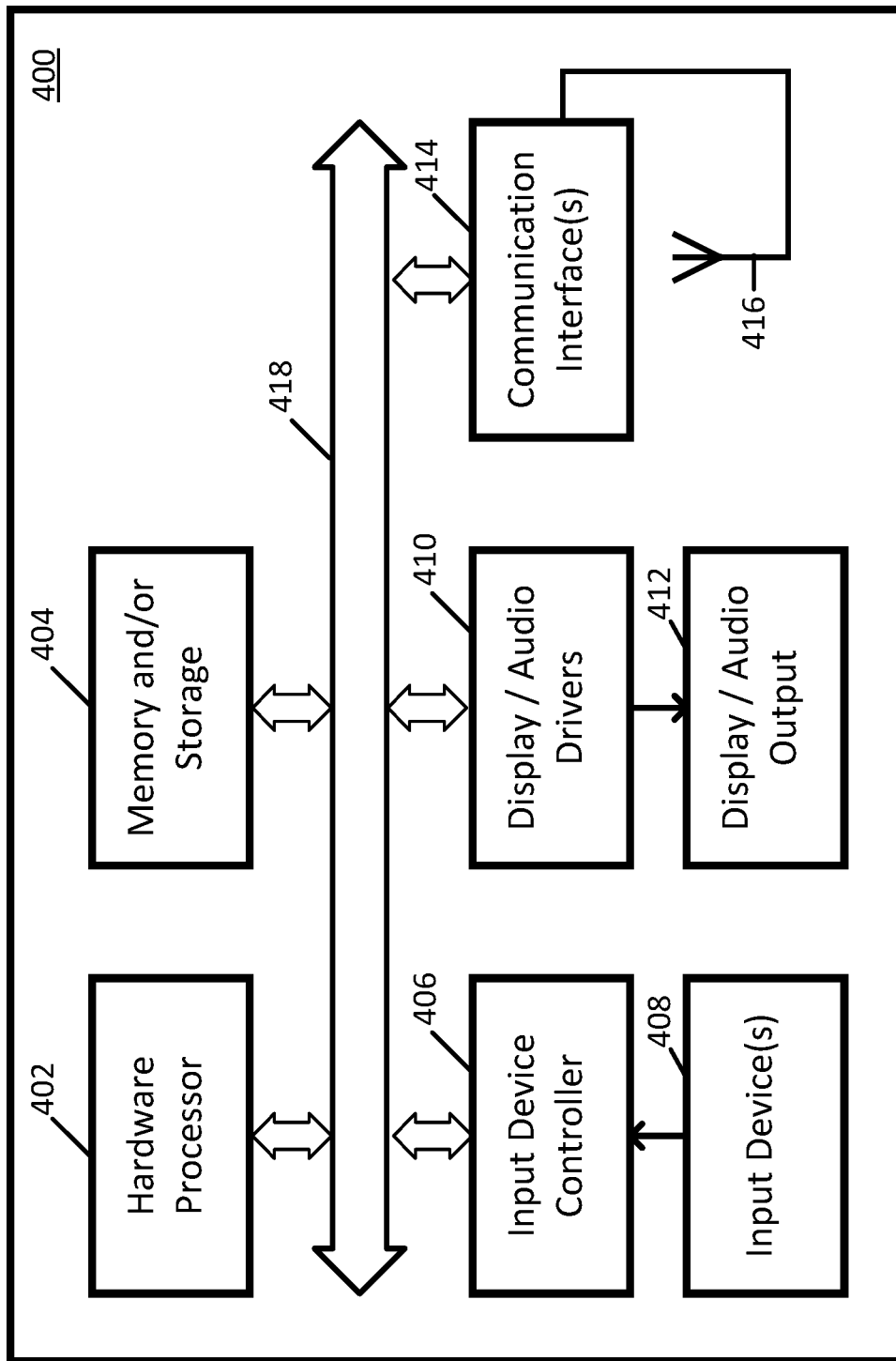
FIG. 4 shows a detailed example of hardware that can be used in a server and/or a vehicle computer of FIG. 3 in accordance with some embodiments of the disclosed subject matter.

Server(s) 302 and vehicle computers 306 can be implemented using any suitable hardware in some embodiments. For example, in some embodiments, devices 302 and 306 can be implemented using any suitable general purpose computer or special purpose computer. For example, a vehicle computer may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage of a server, such as server(s) 302. For example, in some embodiments, the server program can cause hardware processor 402 to determine whether a particular driver is qualified to activate a particular autonomous or semi-autonomous feature, transmit instructions to inhibit a feature in response to determining that a driver is not qualified to activate the feature, and/or perform any other suitable functions. In some embodiments, hardware processor 402 can be controlled by a computer program stored in memory and/or storage 404 of vehicle computer 306. For example, the computer program can cause hardware processor 402 to inhibit a particular feature of a vehicle if a driver is determined to be not qualified to activate the feature, present user interfaces related to a feature, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for controlling access to vehicle features are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for controlling access to vehicle features, comprising:
    determining identifying information of a driver of a vehicle;
    receiving an indication that the driver wants to activate a feature of the vehicle;
    determining, using a hardware processor associated with the vehicle, whether the driver is qualified to activate the feature based on the identifying information;
    in response to determining that the driver is not qualified to activate the feature, inhibiting activation of the feature and causing a user interface to be presented that indicates that the feature cannot be used; and
    in response to determining that the driver is qualified to activate the feature, activating the feature;
    wherein determining whether the driver is qualified to activate the feature comprises determining whether the feature has been changed since a previous time the driver was indicated as qualified to activate the feature, and wherein the user interface that indicates that the feature cannot be used further indicates a change to the feature in response to determining that the feature has been changed since the previous time the driver was indicated as qualified to activate the feature.

2. The method of claim 1, wherein determining whether the driver is qualified to activate the feature based on the identifying information comprises presenting one or more qualifying queries to the driver of the vehicle via the user interface.

3. The method of claim 1, wherein the feature allows the hardware processor to control steering of the vehicle.

4. The method of claim 1, wherein determining identifying information of the driver of the vehicle is based on at least one of facial recognition of the driver of the vehicle, a key fob used to access the vehicle, and user login information.

5. The method of claim 1, wherein the user interface that indicates that the feature cannot be used includes a selectable input that, when selected, causes presentation of information related to the feature to be initiated.

6. The method of claim 1, wherein the presentation of information related to the feature comprises information related to the feature that is presented while the vehicle is stationary and information related to the feature that is presented while the vehicle is in motion and while the feature is activated.

7. A system for controlling access to vehicle features, the system comprising:
    a hardware processor that is programmed to:
        determine identifying information of a driver of a vehicle;
        receive an indication that the driver wants to activate a feature of the vehicle;
        determine whether the driver is qualified to activate the feature based on the identifying information;
        in response to determining that the driver is not qualified to activate the feature, inhibit activation of the feature and cause a user interface to be presented that indicates that the feature cannot be used; and
        in response to determining that the driver is qualified to activate the feature, activate the feature;
        wherein determining whether the driver is qualified to activate the feature comprises determining whether the feature has been changed since a previous time the driver was indicated as qualified to activate the feature, and wherein the user interface that indicates that the feature cannot be used further indicates a change to the feature in response to determining that the feature has been changed since the previous time the driver was indicated as qualified to activate the feature.

8. The system of claim 7, wherein determining whether the driver is qualified to activate the feature based on the identifying information comprises presenting one or more qualifying queries to the driver of the vehicle via the user interface.

9. The system of claim 7, wherein the feature allows the hardware processor to control steering of the vehicle.

10. The system of claim 7, wherein determining identifying information of the driver of the vehicle is based on at least one of facial recognition of the driver of the vehicle, a key fob used to access the vehicle, and user login information.

11. The system of claim 7, wherein the user interface that indicates that the feature cannot be used includes a selectable input that, when selected, causes presentation of information related to the feature to be initiated.

12. The system of claim 7, wherein the presentation of information related to the feature comprises information related to the feature that is presented while the vehicle is stationary and information related to the feature that is presented while the vehicle is in motion and while the feature is activated.

13. A non-transitory computer-readable medium containing computer executable instructions that, when executed by a processor, cause the processor to perform a method for controlling access to vehicle features, the method comprising:
  determining identifying information of a driver of a vehicle;
  receiving an indication that the driver wants to activate a feature of the vehicle;
  determining whether the driver is qualified to activate the feature based on the identifying information;
  in response to determining that the driver is not qualified to activate the feature, inhibiting activation of the feature and causing a user interface to be presented that indicates that the feature cannot be used; and
  in response to determining that the driver is qualified to activate the feature, activating the feature;
  wherein determining whether the driver is qualified to activate the feature comprises determining whether the feature has been changed since a previous time the driver was indicated as qualified to activate the feature, and wherein the user interface that indicates that the feature cannot be used further indicates a change to the feature in response to determining that the feature has been changed since the previous time the driver was indicated as qualified to activate the feature.

14. The non-transitory computer-readable medium of claim 13, wherein determining whether the driver is qualified to activate the feature based on the identifying information comprises presenting one or more qualifying queries to the driver of the vehicle via the user interface.

15. The non-transitory computer-readable medium of claim 13, wherein the feature allows the processor to control steering of the vehicle.

16. The non-transitory computer-readable medium of claim 13, wherein determining identifying information of the driver of the vehicle is based on at least one of facial recognition of the driver of the vehicle, a key fob used to access the vehicle, and user login information.

17. The non-transitory computer-readable medium of claim 13, wherein the user interface that indicates that the feature cannot be used includes a selectable input that, when selected, causes presentation of information related to the feature to be initiated.

18. The non-transitory computer-readable medium of claim 13, wherein the presentation of information related to the feature comprises information related to the feature that is presented while the vehicle is stationary and information related to the feature that is presented while the vehicle is in motion and while the feature is activated.

* * * * *